United States Patent
Lee et al.

(10) Patent No.: US 6,350,488 B1
(45) Date of Patent: Feb. 26, 2002

(54) MASS SYNTHESIS METHOD OF HIGH PURITY CARBON NANOTUBES VERTICALLY ALIGNED OVER LARGE-SIZE SUBSTRATE USING THERMAL CHEMICAL VAPOR DEPOSITION

(75) Inventors: Cheol-jin Lee, Gunsan; Jae-eun Yoo, Seoul, both of (KR)

(73) Assignee: Iljin Nanotech Co., Ltd. (KR)

( * ) Notice: Subject to any disclaimer, the term of this patent is extended or adjusted under 35 U.S.C. 154(b) by 0 days.

(21) Appl. No.: 09/590,687

(22) Filed: Jun. 9, 2000

(30) Foreign Application Priority Data

| Jun. 11, 1999 | (KR) | 99-21855 |
| Jun. 15, 1999 | (KR) | 99-22419 |
| Jun. 2, 2000 | (KR) | 00-30352 |

(51) Int. Cl.$^7$ .............................................. C23C 16/26
(52) U.S. Cl. ................ 427/249.1; 427/250; 427/255.7; 427/343; 438/694; 438/710
(58) Field of Search ............................ 427/249.1, 255.7, 427/337, 343, 250; 438/694, 706, 707, 708, 709, 710

(56) References Cited

U.S. PATENT DOCUMENTS

| 5,641,466 A | 6/1997 | Ebbesen et al. |
| 5,698,175 A | 12/1997 | Hiura et al. |
| 6,062,931 A | 5/2000 | Chuang et al. |

FOREIGN PATENT DOCUMENTS

| JP | 5-133048 | 5/1993 |
| JP | 8-12310 | 1/1996 |
| JP | 11 040767 | 2/1999 |

OTHER PUBLICATIONS

Terrones, M et al., "Controlled production of aligned–nanotube bundles." Nature, vol. 388, Jul. 3, 1997, pp. 52–55.*
De Heer, Walt et al., "Aligned carbon nanotube films: Production and optical and electronic properties." Science, vol. 268, Issue 5212, May 12, 1995, pp. 845–847.*
J. L. Zimmerman, et al., "Gas–Phase Purification of Single––Wall Carbon Nanotubes," Chemistry of Materials, American Chemical Society, vol. 12, No. 5, 2000, pp. 1361–1366.
S. Fan, et al., "Self–Oriented Regular Arrays of Carbon Nanotubes and Their Field Emission Properties," Science, American Association of Advancement of Science, vol. 283, published Jan. 22, 1999, pp. 512–514.
Cheol Jin Lee, et al., "Synthesis of Aligned Carbon Nanotubes Using Thermal Chemical Vapor Deposition," Chem. Phys. Lett., vol. 312, No. 5–6, published Oct. 29, 1999, pp. 461–468.
C. Journet et al., "Large–scale production of single–walled carbon nanotubes by the electric–arc technique," Nature, vol. 388, Aug. 21, 1977, pp. 756–758.
D. S. Bethune et al., "Cobalt–catalysed growth of carbon nanotubes with single–atomic–layer walls," Nature, vol. 363, Jun. 17, 1993, pp. 605–607.
A. Thess et al., "Crystalline Ropes of Metallic Carbon Nanotubes," Science, vol. 273, Jul. 26, 1996, pp. 483–487.

(List continued on next page.)

Primary Examiner—Bret Chen
(74) Attorney, Agent, or Firm—Burns, Doane, Swecker & Mathis, L.L.P.

(57) ABSTRACT

A method of synthesizing high purity carbon nanotubes vertically aligned over a large size substrate by thermal chemical vapor deposition (CVD). In the synthesis method, isolated nano-sized catalytic metal particles are formed over a substrate by etching, and purified carbon nanotubes are grown vertically aligned, from the catalytic metal particles by thermal CVD using a carbon source gas.

18 Claims, 6 Drawing Sheets

OTHER PUBLICATIONS

R. Andrews et al., "Continuous production of aligned carbon nanotubes: a step closer to commercial realization," Chemical Physics Letters, vol. 303, Apr. 16, 1999, pp. 467–474.

W. Z. Li et al., "Large–scale Synthesis of Aligned Carbon Nanotubes," Science, vol. 274, Dec. 6, 1996, pp. 1701–1703.

Kingsuk Mukhopadhyay et al., "A Simple and Novel Way to Synthesize Aligned Nanotube Bundles at Low Temperature," Japan J. Appl. Phys., vol. 37, Part 2, No. 10B, Oct. 15, 1998, pp. L1257–L1259.

Z. F. Ren et al., "Synthesis of Large Arrays of Well–Aligned Carbon Nanotubes on Glass," Science, vol. 282, Nov. 6, 1998, pp. 1105–1107.

M. Kusunoki et al., "Epitaxial carbon nanotube film self–organized by sublimation decomposition of silicon carbide," Appl. Phys. Lett., vol. 71, No. 18, Nov. 3, 1977, pp. 2620–2622.

S. Iijima, "Helical microtubules of graphitic carbon," Nature, vol. 354, Nov. 7, 1991, pp. 56–58.

S. Kanemaru et al., "Active Matrix of Si Field Emitters Driven By Built–in MOSFETS," IDW '97, pp. 735–738, 1997.

H. Gamo et al., "Actively–Controllable Field Emitter Arrays with Built–in Thin Film Transistors on Glass For Active–Matrix FED Applications," IDW '98, pp. 667–670, 1998.

* cited by examiner

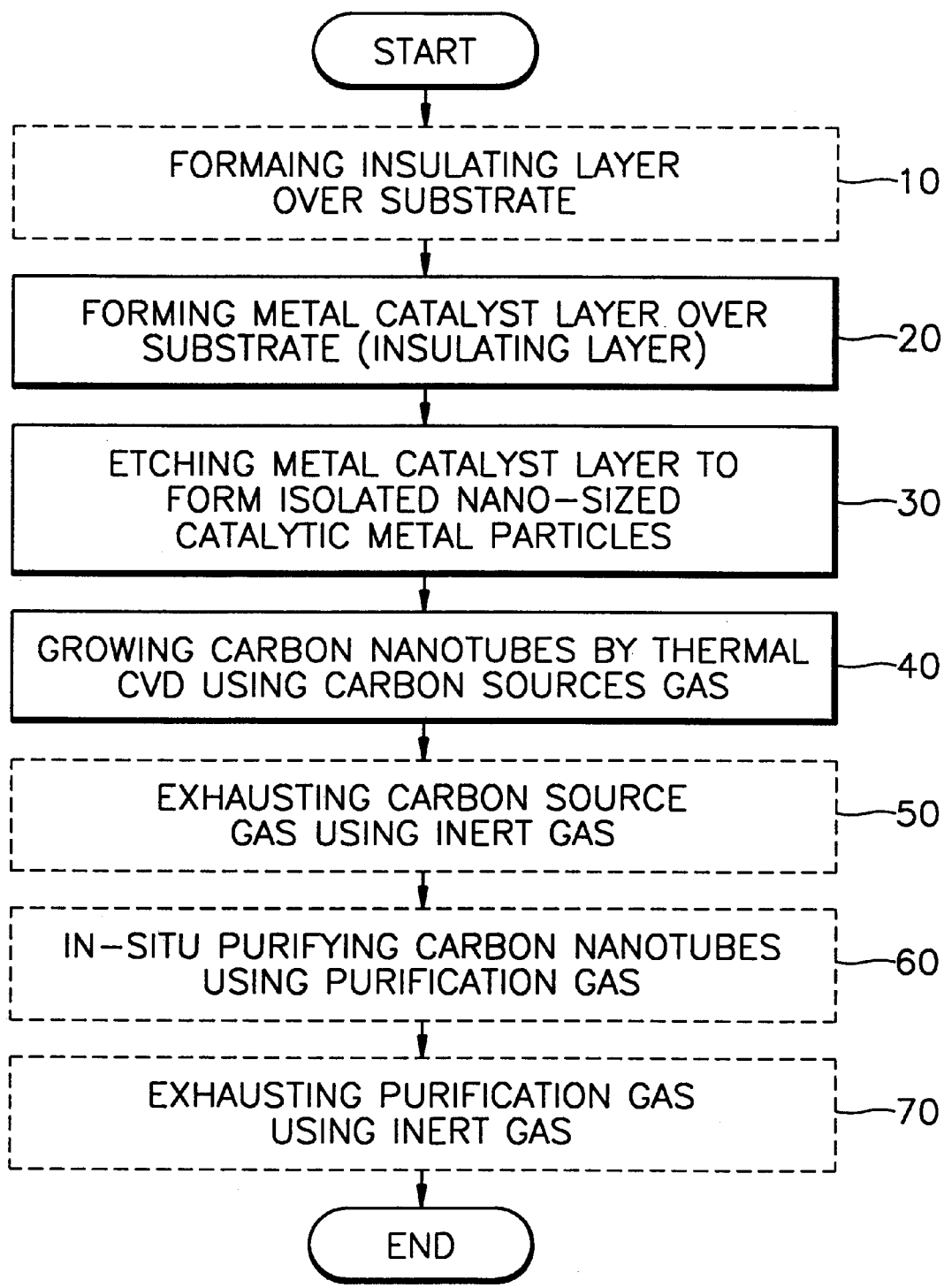

MASS SYNTHESIS METHOD OF HIGH PURITY CARBON NANOTUBES VERTICALLY ALIGNED OVER LARGE-SIZE SUBSTRATE USING THERMAL CHEMICAL VAPOR DEPOSITION

This application claims priority under 35 U.S.C. §§119 and/or 365 to 99-21855 filed in Korea on Jun. 11, 1999, 99-22419 filed in Korea on Jun. 15, 1999, and 00-30352 filed in Korea on Jun. 2, 2000; the entire content of which is hereby incorporated by reference.

BACKGROUND OF THE INVENTION

1. Field of the Invention

The present invention relates to a synthesis method of carbon nanotubes, and more particularly, to a mass synthesis method of synthesizing high purity carbon nanotubes vertically aligned over a large area substrate.

2. Description of the Related Art

Carbon nanotubes, which have conductivity in an arm-chair structure and semiconductivity in a zig-zag structure, are applied as an electron emission source for field emission devices, white light sources, lithium secondary batteries, hydrogen storage cells, transistors or cathode ray tubes (CRTs). For such industrial applications of carbon nanotubes, it is profitable to synthesize high purity carbon nanotubes over a large-area substrate in a vertically aligned form. Also, it is another concern that the diameter and length of carbon nanotubes, and the density and uniformity of carbon nanotubes over a substrate used can be easily controlled for the carbon nanotube synthesis.

Existing carbon nanotube synthesis techniques include an arc discharge method, laser vaporization method, gas phase synthesis, thermal chemical vapor deposition (CVD) method, plasma CVD method and the like.

The arc discharge method (C. Journet et al., *Nature*, 388, 756 (1997) and D. S. Bethune et al., *Nature*, 363, 605 (1993)) and the laser vaporization method (R. E. Smally et al., *Science*, 273, 483 (1996)) are not able to control the diameter or length of carbon nanotubes and the yield by these methods is low. Moreover, excess amorphous carbon lumps are also produced along with carbon nanotubes, and thus they need complicated purification processes. Thus, it has a difficulty in growing carbon nanotubes over a large-size substrate on a large production scale by these methods.

Meanwhile, the gas phase synthesis method (R. Andrews et al., *Chem. Phys. Lett.*, 303, 468, 1999), which is appropriate for mass synthesis of carbon nanotubes, produces carbon nanotubes in a gas phase by pyrolysis of carbon source gas in a furnace without using a substrate. However, this method also has difficulty in controlling the diameter or length of carbon nanotubes, and causes adhering of metal catalyst lumps to the inner or outer sidewalls of carbon nanotubes. Thus, the method cannot meet the need for high purity carbon nanotubes and cannot achieve vertical alignment of carbon nanotubes over a substrate.

The thermal CVD method known in this art up to now involves growing carbon nanotubes over a porous silica (W. Z. Li et al., *Science*, 274, 1701 (1996)) or zeolite (Shinohara et al., Japanese *J. of Appl. Phys.*, 37, 1357 (1998)) substrate. However, filling pores of the substrate with a metal catalyst is a complicated and time consuming process. Moreover, the controlling of the diameter of carbon nanotubes is not easy, and the yield is low. Thus, the thermal CVD method has a limitation in growing massive carbon nanotubes over a relatively large substrate.

The plasma CVD method (Z. F. Ren et al., *Science*, 282,1105 (1998)) is a suitable technique for vertically aligning carbon nanotubes, with excellent performance. However, there are problems in that plasma energy damages carbon nanotubes and the structure of the carbon nanotubes is unstable due to the synthesis process at low temperatures. In addition, many carbon particles adhere to the surface of carbon nanotubes.

SUMMARY OF THE INVENTION

To solve the above problems, it is an objective of the present invention to provide a mass synthesis method of high purity carbon nanotubes vertically aligned over a large-size substrate.

The objective of the present invention is achieved by a method of synthesizing carbon nanotubes, comprising forming a metal catalyst layer over a substrate. The metal catalyst layer is etched to form isolated nano-sized catalytic metal particles, and carbon nanotubes vertically aligned over the substrate are grown from respective isolated nano-sized catalytic metal particle by thermal chemical vapor deposition (CVD) in which a carbon source gas is supplied to a thermal CVD apparatus to form carbon nanotubes.

Preferably, forming the isolated nano-sized catalytic metal particles is performed by a gas etching method in which one etching gas selected from the group consisting of ammonia gas, hydrogen gas and hydride gas is thermally decomposed for use in etching. Forming the isolated nano-sized catalytic metal particles may be performed by plasma etching, or wet etching using a hydrogen fluoride series etchant.

Preferably, the etching gas is ammonia, and the gas etching method is performed at a temperature of 700 to 1000° C. while supplying the ammonia gas at a flow rate of 80 to 400 sccm for 10 to 30 minutes.

Preferably, forming the carbon nanotubes is performed at a temperature of 700 to 1000° C. while supplying the carbon source gas at a flow rate of 20 to 200 sccm for 10 to 60 minutes.

Preferably, forming the catalytic metal particles and forming the carbon nanotubes are in-situ performed in the same thermal CVD apparatus.

Preferably, in forming the carbon nanotubes, one gas selected from the group consisting of ammonia gas, hydrogen gas and hydride gas is supplied to the thermal CVD apparatus along with the carbon source gas.

Preferably, after forming the carbon nanotubes, the synthesis method further comprises exhausting the carbon source gas using an inert gas from the thermal CVD apparatus.

Preferably, after forming the carbon nanotubes, the synthesis method further comprises in-situ purifying the carbon nanotubes in the same thermal CVD apparatus. Preferably, in-situ purifying the carbon nanotubes is performed with a purification gas selected from the group consisting of ammonia gas, hydrogen gas, oxygen gas and a mixture of these gases.

Preferably, after in-situ purifying the carbon nanotubes, the synthesis method further comprises exhausting the purification gas using an inert gas from the thermal CVD apparatus.

BRIEF DESCRIPTION OF THE DRAWINGS

The above objective and advantages of the present invention will become more apparent by describing in detail preferred embodiments thereof with reference to the attached drawings described briefly below.

FIG. 1 is a flow chart illustrating a method of synthesizing carbon nanotubes according to the present invention.

DETAILED DESCRIPTION OF THE INVENTION

Figure 2A:
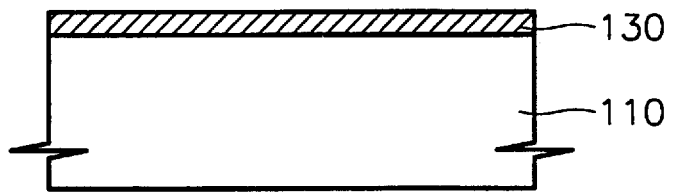
FIGS. 2A and 2B are sectional views of a substrate having a metal catalyst layer.

The present invention will now be described more fully with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the concept of the invention to those skilled in the art. The appended figure of a thermal chemical vapor deposition (CVD) apparatus is schematically illustrated for explanation. In the drawings, the thickness and proportions of a substrate, catalyst metal layer and catalytic metal particles are exaggerated for clarity. It is also noted that like reference numerals may be used to designate identical or corresponding parts throughout the drawings.

Embodiment 1

Figure 2B:
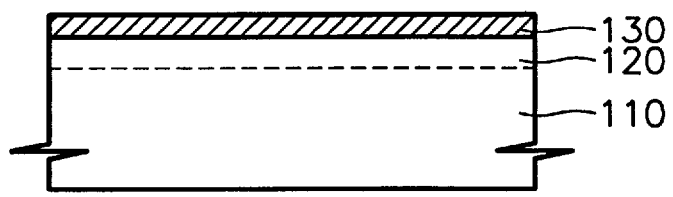

A method of synthesizing carbon nanotubes according to the present invention will be described with reference to FIG. 1, which is a flowchart illustrating the synthesis method, FIGS. 2A and 2B, which are sectional views of a substrate on which carbon nanotubes are to be formed, and FIG. 3, which is a schematic view of a thermal chemical vapor deposition (CVD) apparatus used in the synthesis. In the flowchart, the essential steps for the synthesis are illustrated in solid-line boxes, while optional steps for the same are illustrated in dashed-line boxes.

Referring to FIG. 1, a metal catalyst layer (130 of FIG. 2A) is formed over a substrate (110 of FIG. 2A) on which carbon nanotubes are to be formed (step 20). As the substrate 110, a glass, quartz, silicon or alumina ($Al_2O_3$) substrate can be used. The metal catalyst layer 130 is formed of cobalt (Co), nickel (Ni), iron (Fe) or an alloy of the same (Co—Ni, Co—Fe or Ni—Fe). The metal catalyst layer 130 is formed over the substrate 110 to a thickness of a few nanometers to a few hundred nanometers, preferably, to a thickness of 2 to 200 nm, by thermal deposition, electron-beam deposition or sputtering.

In the case where the substrate 110 made of silicon is used and the metal catalyst layer 130 is formed of Co, Ni or an alloy of the same, an insulating layer (120 of FIG. 2B) is formed over the substrate 100 before the formation of the metal catalyst layer 130, which prevents generation of a silicide film by a reaction between the metal catalyst layer 130 and the substrate 110 (step 10). A silicon oxide or alumina layer can be formed as the insulating layer 120.

Following this, the metal catalyst layer 130, is etched to form independently isolated nano-sized catalytic metal particles (step 30).

Figure 3:
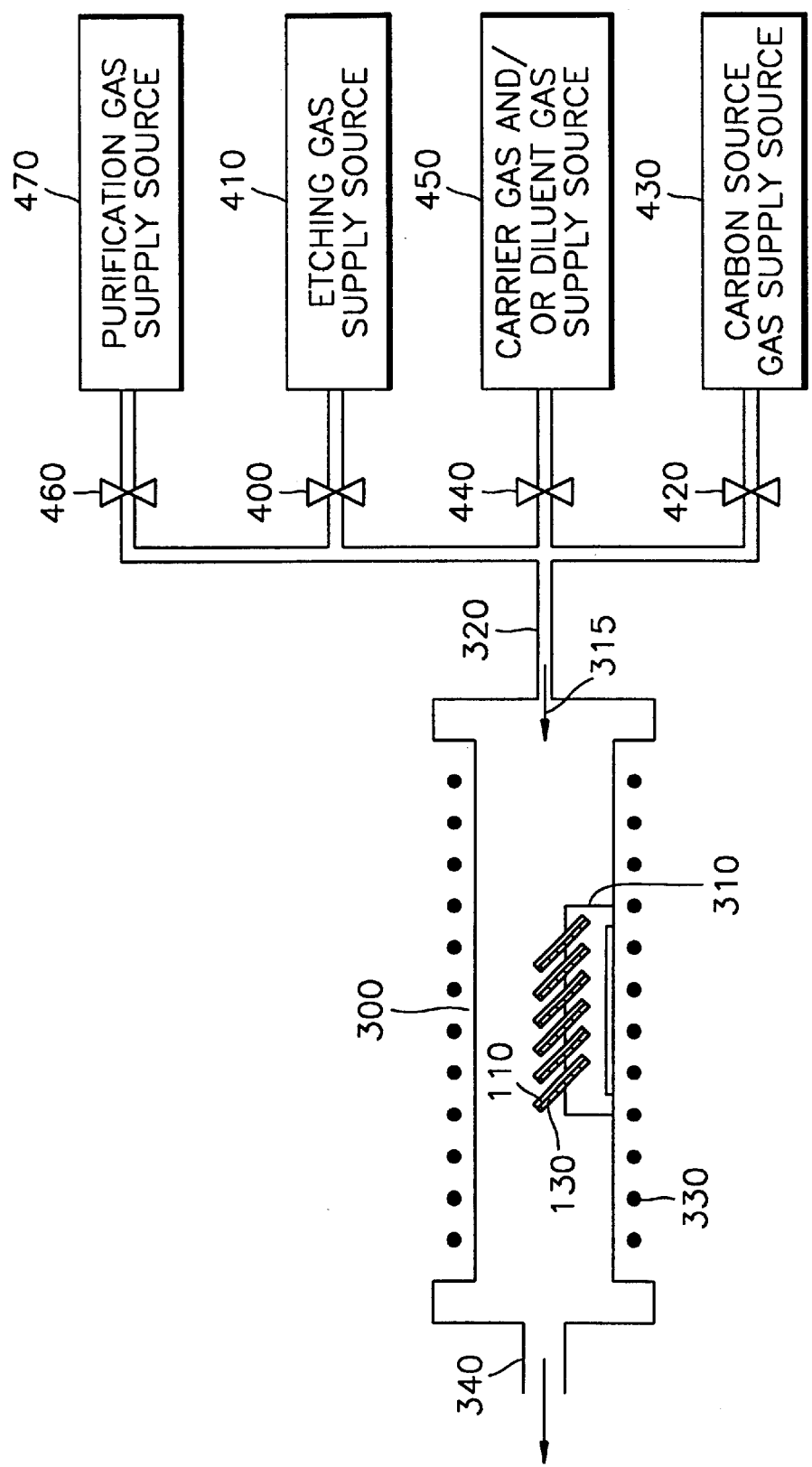
FIG. 3 is a schematic view of a thermal chemical vapor deposition (CVD) apparatus used in the preferred embodiments of the present invention.

In particular, referring to FIG. 3, substrates having the metal catalyst layer 130, or the insulating layer 120 and the metal catalyst layer 130, are put into a boat 210 of a thermal CVD apparatus, spaced a predetermined distance apart, and the boat 310 is loaded into a reaction furnace of the thermal CVD apparatus. Here, the boat 310 is loaded such that the surface of the metal catalyst layer 130 formed over substrate faces downward in the opposite direction to the flow of gas, indicated by arrow 315, as show in FIG. 3. The reason why the substrates 110 are arranged such that the surface of the metal catalyst layer 130 does not face the flow of gas is so that a uniform reaction over the substrates 110 coated by the metal catalyst layers 130 can be achieved by evenly controlling the mass flow of etching gas. Also, the insertion of the substrates 110 into the boat 310 such that the surface of the metal catalyst layer 130 faces downwards is to prevent defects due to unstable reaction product, or carbon particles falling down from the wall of the reaction furnace 300.

After loading the boat 310 into the reaction furnace, the pressure of the reaction furnace 330 is maintained at atmospheric pressure (in the case of using an atmospheric pressure CVD apparatus) or on the order of a few hundred mTorr to a few Torr (in the case of using a low-pressure CVD apparatus). Then, the temperature of the reaction furnace 300 is raised to 700 to 1000° C. by a resistance coil 330 mounted around the outer wall of the reaction furnace 300. When the temperature of the reaction furnace 300 reaches a predetermined processing temperature, a first valve 400 is opened to allow an etching gas from an etching gas supply source 410 to flow into the reaction furnace 330 through a gas inlet 320. The etching gas may be ammonia gas, hydrogen gas or hydride gas, but ammonia gas is preferred. If ammonia gas is used as the etching gas, the ammonia gas is supplied at a flow rate of 80 to 400 sccm for 10 to 30 minutes. The upper limit of the processing temperature, 700° C., refers to the minimum temperature at which the etching gas can be decomposed for etching.

Figure 4:
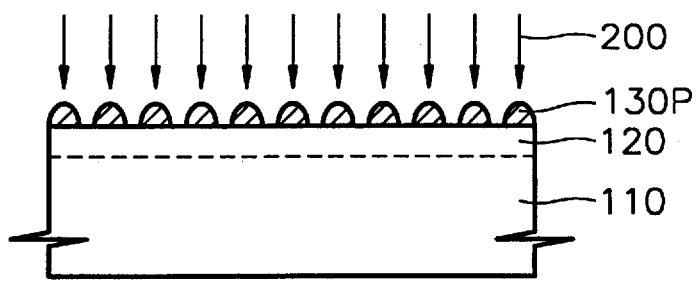
FIG. 4 is a sectional view illustrating the formation of independently isolated catalytic metal particles.

As shown in FIG. 4, the etching gas 200 introduced into the reaction furnace 300 etches along grain boundaries the metal catalyst layer 130, to form independently isolated nano-sized catalytic metal particles 130P over the substrate 110 in high density with uniformity. The term "nano size" used in the specification refers to the size of a few nanometers to a few hundred nanometers. The size and shape of isolated nano-sized catalytic metal particles vary according to etching conditions. Also, the shape of catalytic metal particles affects the shape of carbon nanotubes produced in a subsequent process.

Then, a carbon source gas is supplied into the thermal CVD apparatus to grow carbon nanotubes over the substrate 110 (step 40).

The growing of carbon nanotubes (step 40) is performed in-situ with the formation of nano-sized catalytic metal particles (step 30). In particular, the first valve 400 of FIG. 3 is closed to cut off the supply of ammonia gas, and a second valve 420 is opened to supply a carbon source gas from the gas supply source 430 into the reaction furnace 300 through the gas inlet 320. The temperature of the reaction furnace 300 is kept at the same temperature as when the nano-sized isolated catalytic metal particles 130P are formed, i.e., in the range of 700 to 1000° C. The carbon source gas is supplied at a flow rate of 20 to 200 sccm for 10 to 60 minutes. Also, hydrocarbon gas having 1 to 3 carbon atoms is used as the carbon source gas. Acetylene, ethylene, ethane, propylene, propane or methane gas is preferred as the carbon source gas. The lower limit of the processing temperature, 700° C., refers to the minimum temperature which enables full pyrolysis of the carbon source gas.

To control the growth rate and time of carbon nanotubes, a carrier gas (inert gas such as hydrogen or argon) and/or a diluent gas (hydride gas) can be supplied along with the carbon source gas into the reaction furnace 300 from a carrier and/or diluent gas supply source 450 by opening a third valve 440.

The density and growth pattern of carbon nanotubes synthesized over the substrate can also be controlled by supplying an etching gas (ammonia gas, hydrogen gas or hydride gas) in a predetermined ratio along with the carbon source gas. Preferably, the carbon source gas and the etching gas are supplied in a ratio of 2:1 to 3:1 by volume.

Figure 5:
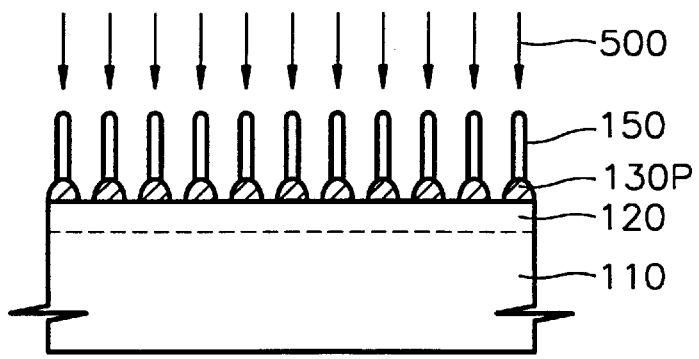
FIG. 5 is a sectional view illustrating the growth of carbon nanotubes from the isolated catalytic metal particles.

As shown in FIG. 5, the carbon source gas supplied into the reaction furnace 300 is pyrolized to grow carbon nanotubes protruding from the nano-sized catalytic metal particles 130P.

Figure 6A:
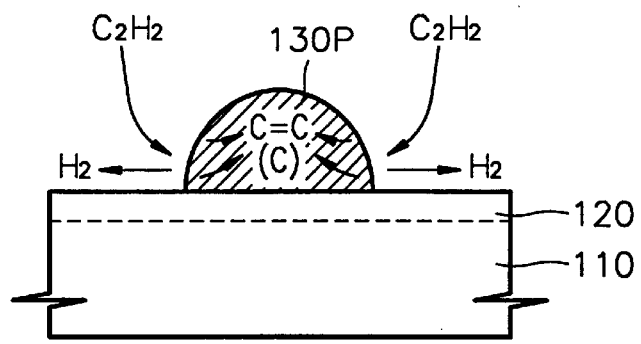
FIGS. 6A through 6C are schematic views illustrating a mechanism of growing carbon nanotubes from the isolated catalytic metal particles.
Figure 6B:
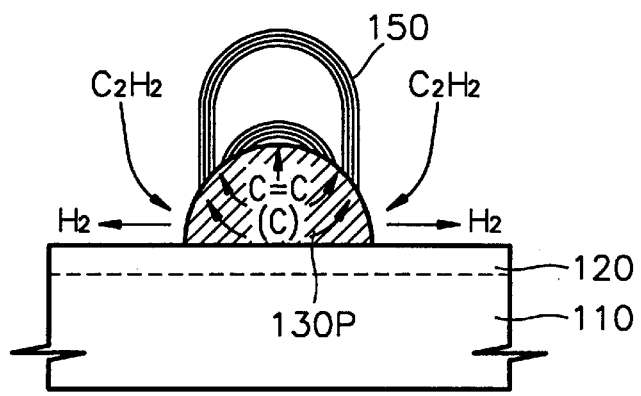
Figure 6C:
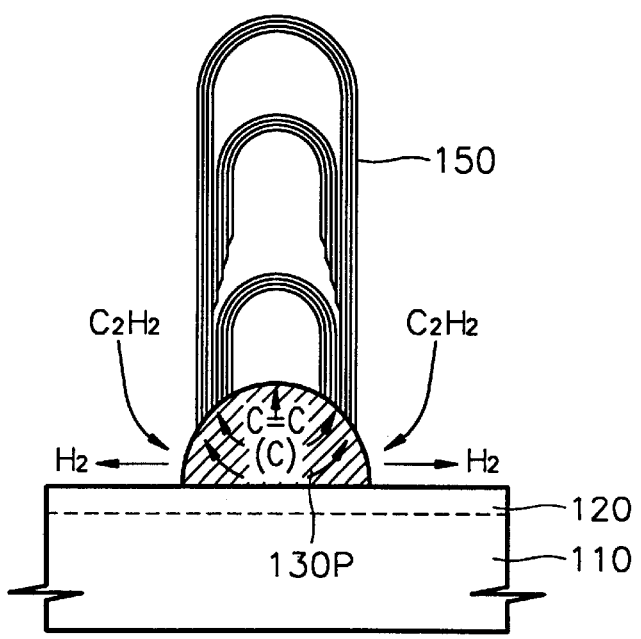

FIGS. 6A through 6C are schematic views of a base growth model. The growth mechanism will be described with reference to FIGS. 6A through 6C. First, as shown in FIG. 6A, a carbon source gas (for example, acetylene gas ($C_2H_2$)) supplied into the reaction furnace 300 of the thermal CVD apparatus is pyrolized in a gas phase into carbon units (C=C or C) and free hydrogen ($H_2$). The carbon units adsorb onto the surface of the catalytic metal particles 130P and diffuse into the catalytic metal particles 130P. When the catalytic metal particles 130P are supersaturated with the dissolved carbon units, growth of carbon nanotubes 150 is initiated. As the intrusion of the carbon units into the catalytic metal particles 130P is continued, the carbon nanotubes 150 grow, like a bamboo, as shown in FIG. 6C, by the catalytic function of the catalytic metal particles 130P. If the catalytic metal particles 130P have round or blunt tips, the carbon nanotubes 150 are grown with round or blunt tips. Although not illustrated in the drawings, if nano-sized metal catalytic particles 130P have sharp tips, carbon nanotubes are grown to have sharp tips.

Although the first embodiment is described with reference to a horizontal type thermal (CVD) apparatus, it is appreciated that a vertical type, in-line type or conveyer type CVD apparatus can be employed.

The synthesis method of the first embodiment can produce carbon nanotubes having a diameter of a few nanometers to a few hundred nanometers, for example, 1 to 400 nm, and a length of a few micrometers to a few hundred micrometers, for example, 0.5 to 300 µm.

After the synthesis of carbon nanotubes is completed, optionally the carbon nanotubes 10 can be subjected to in-situ purification (step 60). Carbon lumps or carbon particles, which are present on the surface of the grown carbon nanotubes 150, are removed in-situ with the growing (step 40) of the carbon nanotubes.

In particular, the second valve 420 of FIG. 3 is closed to cut off the supply of the carbon source gas and a fourth valve 460 is opened to supply a purification gas from a purification gas supply source 470 to the reaction furnace 300 through the gas inlet 320. Ammonia gas, hydrogen gas, oxygen gas, or a mixture of these gases is used as the purification gas. When ammonia gas or hydrogen gas is selected as the purification gas, the purification gas can be supplied from the etching gas supply source 410 or the carrier gas and/or diluent gas supply source 450, without a need for the purification gas supply source 470.

During the purification process, the temperature of the reaction furnace 300 is maintained at a temperature of 500 to 1000° C. and the purification gas is supplied into the reaction furnace 300 at a flow rate of 40 to 200 sccm for 10 to 30 minutes.

Hydrogen ions ($H^+$), generated by thermal decomposition of ammonia gas or hydrogen gas, remove unnecessary carbon lumps or carbon particles. For oxygen gas as a purification gas, oxygen ions ($O^{2-}$), which are derived by thermal decomposition of the oxygen gas, combust carbon lumps or carbon particles. As a result of the purification, the carbon lumps, carbon particles and the like are entirely removed from the surface of the carbon nanotubes 150, which results in purified carbon nanotubes.

Figure 7:
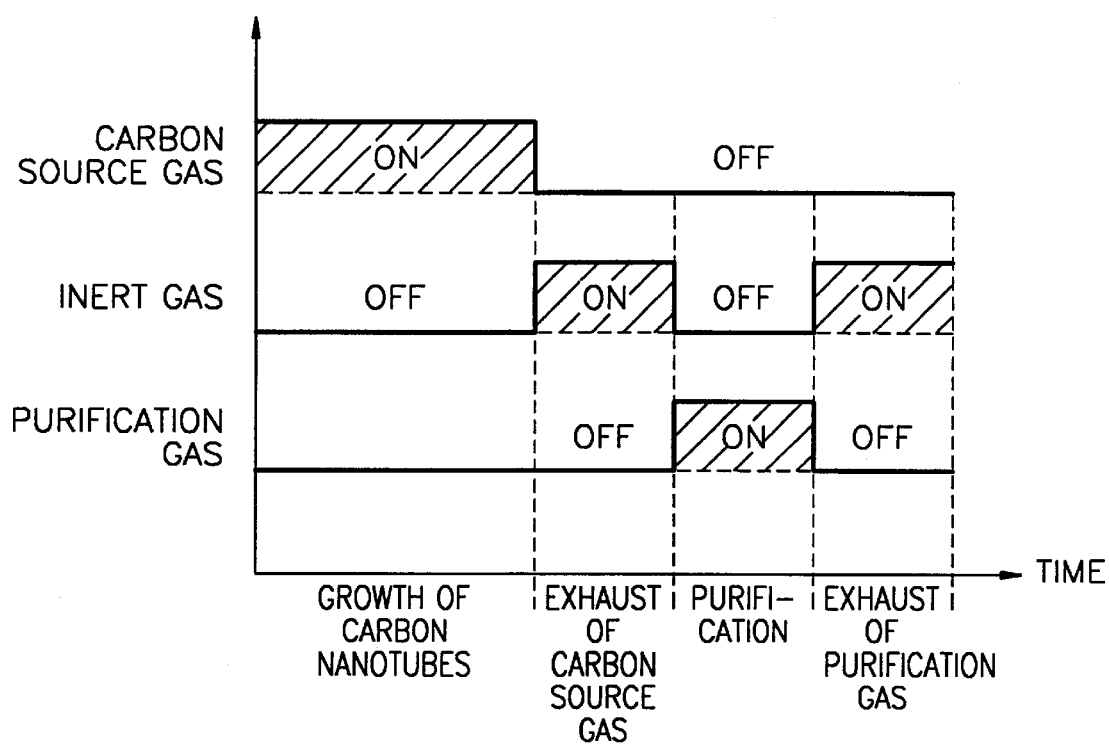
FIG. 7 is a timing chart illustrating a gas pulsing technique applied in an in-situ purification process using a purification gas.

It is preferable that before the purification (step 60), an inert gas is supplied into the reaction furnace 300, as illustrated in FIG. 7, at a rate of 200 to 500 sccm to exhaust the remaining carbon source gas from the reaction furnace 300 through a gas outlet 340 (step 50 of FIG. 1). Argon gas is preferred as the inert gas. By doing so, the length of carbon nanotubes grown can be accurately controlled and undesired reaction due to the carbon source gas which remains after the synthesis of the carbon nanotubes, can be prevented.

It is also preferable that after the purification (step 60), an inert gas is supplied into the reaction furnace 300 at a rate of 200 to 500 sccm to exhaust the remaining purification gas from the reaction furnace 30 through the gas outlet 340 (step 70 of FIG. 1). During the exhausting of the purification gas, preferably the temperature of the reaction furnace 300 is lowered. The exhausting of the purification gas (step 70) is for preventing partial damage of carbon nanotubes 150 by the purification gas when the temperature of the reaction furnace 300 is lowered.

According to the first embodiment of the synthesis method, the nano-sized catalytic metal particles, which are suitable for growth of carbon nanotubes, are isolated from each other with a high density, without agglomerating, and thus amorphous carbon clumps are not produced in the synthesis of carbon nanotubes. Thus, the carbon nanotubes can be vertically aligned over the substrate with high purity.

The isolated nano-sized catalytic metal particles are uniformly formed over the substrate with high density by etching the metal catalyst layer formed over the substrate. Thus, when a large-size substrate is adopted, carbon nanotubes can be uniformly and densely grown over the large substrate in a vertical direction, regardless of positions on the substrate.

Also, since the density and size of catalytic metal particles can be controlled by changing the etching conditions, for example, flow rate of etching gas such as ammonia gas, and etching temperature and time, the controlling of the density and diameter of carbon nanotubes is easy.

The first embodiment according to the present invention has an advantage in that the length of carbon nanotubes can be easily controlled by changing the flowing conditions of carbon source gas, for example, flow rate, and reaction temperature and time.

In addition, use of the thermal CVD apparatus enables a batch-type synthesis in which a number of substrates can be simultaneously loaded into the apparatus for the synthesis of carbon nanotubes, and thus yield is raised.

The formation of catalytic metal particles, and the formation of carbon nanotubes using carbon source gas are in-situ performed in the same range of temperature. Also, the purification of carbon nanotubes is performed in-situ with the synthesis thereof. Thus, considering other synthesis methods in which different chambers are needed for each process, the time required for chamber-to-chamber substrate transfer, and the ramp-up time to an appropriate temperature in each chamber can be reduced. Also, the purification process is simple. As a result, there is an advantage in that the yield of purified carbon nanotubes can be increased to a maximum level.

Embodiment 2

The difference from the first embodiment is that in the second embodiment the formation of nano-sized catalytic metal particles (step 30) is performed by plasma etching, rather than by etching with thermally decomposed gas. Plasma etching is advantageous in that the etching can be performed at low temperatures and the controlling of reaction is easy.

Plasma etching can be performed independently in a plasma etching apparatus or can be performed in a plasma etching apparatus combined with a thermal CVD apparatus to be used in subsequent formation of carbon nanotubes. The combination type system may be a multi-chamber system in which a plasma etching apparatus and a thermal CVD apparatus are assembled in a single cluster, or a combination of a remote plasma system and a thermal CVD apparatus. The combination type system is preferred so as to reduce time consuming for the transfer of substrate and to prevent exposure of the substrate to contaminants in the air.

As for the independent plasma etching apparatus, a plasma is produced under the processing conditions of a frequency of 13.6 MHz, a gas pressure of 0.1 to 10 Torr, and power of 50 to 200 watts, by supplying ammonia gas, hydrogen gas or hydride gas to the reaction chamber at a flow rate of 30 to 300 sccm. Then, the metal catalyst layer formed over a substrate is etched with the plasma at 350 to 600° C. for 5 to 30 minutes in the same way as in the first embodiment, to form isolated nano-sized catalytic metal particles.

As for the combination type system including remote plasma apparatus in combination with chemical CVD system, a plasma is created by supplying ammonia gas, hydrogen gas or hydride gas at a flow rate of 30 to 300 sccm into the remote plasma apparatus by application of a frequency of 13.6 MHz, and then the produced plasma is supplied into the chemical CVD apparatus to form isolated nano-sized catalytic metal particles. Here, the etching by plasma is performed at 350 to 600° C. for 5 to 30 minutes.

Most preferably, plasma is generated with ammonia gas.

Then, the first embodiment is followed to form carbon nanotubes.

Embodiment 3

The third embodiment is different from the previous first and second embodiments in that isolated nano-sized catalytic metal particles are obtained by wet etching, rather than dry etching. In particular, a substrate having the metal catalyst layer is immersed into an etchant, for example, a hydrogen fluoride series etchant (HF solution diluted with deionized water, or a mixed solution of HF and $NH_4F$) for 1 to 5 minutes, to form isolated nano-sized catalytic metal particles. An advantage of this wet etching technique lies in that the etching can be performed at low temperatures.

Then, the first embodiment is followed to form carbon nanotubes.

Embodiment 4

The fourth embodiment is a combination of the first and third embodiments. First, wet etching is performed as in the third embodiment, and then dry etching using gas is performed as in the first embodiment. In particular, a substrate having the metal catalyst layer is etched in an etchant (HF solution diluted with deionized water) for 1 to 5 minutes, and dried. Following this, as in the first embodiment, the substrate is loaded into the thermal CVD apparatus and ammonia gas, as an etching gas, is introduced into the apparatus at a flow rate of 60 to 300 sccm for 5 to 20 minutes, to form isolated nano-sized catalytic metal particles over the substrate.

Then, the first embodiment is followed to form carbon nanotubes.

Embodiment 5

The difference from the first embodiment is in that the formation of nano-sized catalytic metal particles (step 30) is performed by photolithography, rather than by etching with thermally decomposed gas.

Figure 8A:
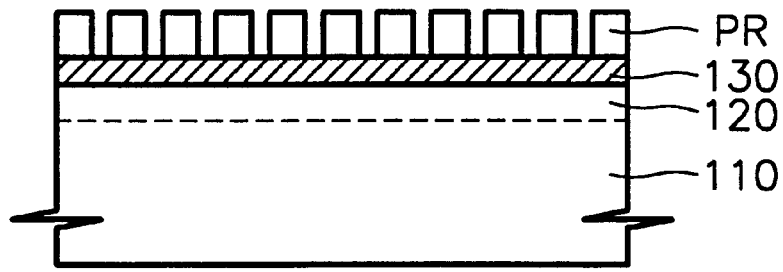
FIGS. 8A through 8C are sectional views illustrating formation of nano-sized catalytic metal particles by photolithography.

In particular, as shown in FIG. 8A, the metal catalyst layer 130 is coated with photoresist and subjected to exposure and development processing to form a nano-sized photoresist pattern PR, for example, having dimensions of a few nanometers to a few hundred nanometers.

Figure 8B:
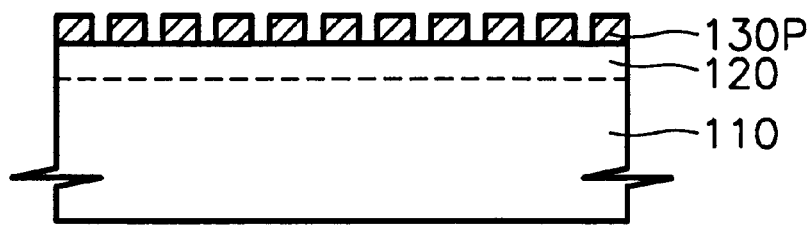
Figure 8C:
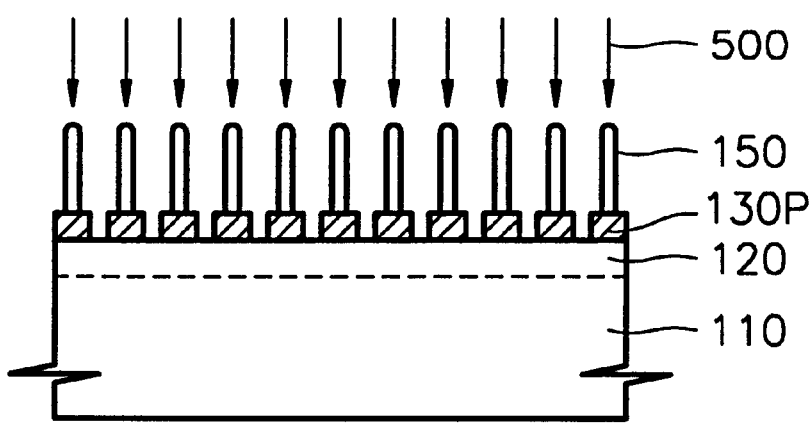

Following this, the metal catalyst layer 130 is etched using the photoresist pattern PR as an etching mask to form nano-sized catalytic metal particles 130P, as shown in FIG. 8B. Then, the photoresist patterns PR are removed and carbon nanotubes 150 are grown from the catalytic metal particles 130P as in the first embodiment, as shown in FIG. 8C.

In the present embodiment, where the catalytic metal particles are formed by photolithography, the size and density of catalytic metal particles can be easily controlled by controlling the size and density of the photoresist pattern. Thus, it is possible to arbitrarily control the diameter and density of carbon nanotubes.

The present invention will be described in greater detail by means of the following experimental examples. The following experimental examples are for illustrative purposes and not intended to limit the scope of the invention.

EXPERIMENTAL EXAMPLE 1

A silicon oxide film was formed over a silicon substrate having a size of 2 cm by 3 cm, to a thickness of 1500 Å, and an iron (Fe) film was formed over the silicon oxide film to a thickness of 100 nm by thermal deposition. The substrate with the Fe film was loaded into a thermal CVD apparatus. Then, the pressure of the furnace of the CVD apparatus was kept at 760 Torr and the temperature of the furnace was raised to 950° C. Following this, ammonia gas was introduced into the furnace at a flow rate of 100 sccm for 20 minutes to form isolated iron particles. While maintaining the temperature at 950° C., acetylene gas was supplied at a flow rate of 40 sccm for 10 minutes to grow carbon nanotubes from each of the iron particles. Scanning electron microscopy (SEM) shows that carbon nanotubes are vertically and uniformly grown over the substrate. According to transmission electron microscopy (TEM), the obtained carbon nanotubes have a diameter of about 80 nm and a length of about 120 μm.

EXPERIMENTAL EXAMPLE 2

To synthesize carbon nanotubes, the process of Experimental Example 1 was followed except that a nickel (Ni) film was used, instead of the Fe film, as the metal catalyst layer. SEM shows that carbon nanotubes are vertically and uniformly grown over the substrate. According to TEM, the obtained carbon nanotubes have a diameter of about 50 nm and a length of about 80 μm.

EXPERIMENTAL EXAMPLE 3

To synthesize carbon nanotubes, the process of Experimental Example 1 was followed except that a cobalt (Co) film was used, instead of the Fe film, as the metal catalyst layer. SEM shows that carbon nanotubes are vertically and uniformly grown over the substrate. According to TEM, the obtained carbon nanotubes have a diameter of about 70 nm and a length of about 30 μm.

EXPERIMENTAL EXAMPLE 4

To synthesize carbon nanotubes, the process of Experimental Example 1 was followed except that a Co—Ni alloy film was used, instead of the single Fe film, as the metal catalyst layer. SEM shows that carbon nanotubes are vertically and uniformly grown over the substrate. According to TEM, the obtained carbon nanotubes have a diameter of about 90 nm and a length of about 100 μm.

EXPERIMENTAL EXAMPLE 5

To synthesis carbon nanotubes, the process of Experimental Example 4 was followed except that a Co—Fe alloy film was used, instead of the Co—Ni alloy film, as the metal catalyst layer. SEM shows that carbon nanotubes are vertically and uniformly grown over the substrate. According to TEM, the obtained carbon nanotubes have a diameter of about 90 nm and a length of about 80 μm.

EXPERIMENTAL EXAMPLE 6

To synthesize carbon nanotubes, the process of Experimental Example 4 was followed except that a Ni—Fe alloy film was used, instead of the Co—Ni alloy film, as the metal catalyst layer. SEM shows that carbon nanotubes are vertically and uniformly grown over the substrate. According to TEM, the obtained carbon nanotubes have a diameter of about 80 nm and a length of about 80 μm.

EXPERIMENTAL EXAMPLE 7

A silicon oxide film was formed over a silicon substrate having a size of 2 cm by 3 cm, to a thickness of 1500 Å, and an Ni film was formed over the silicon oxide film to a thickness of 100 nm by sputtering. The substrate with the Ni film was loaded into a plasma etching apparatus. The pressure of the plasma etching apparatus was set to 1.5 Torr and the frequency of the apparatus was set to 13.6 MHz. After raising the temperature of the plasma etching apparatus to 550° C., ammonia gas was supplied into the apparatus at a flow rate of 200 sccm to create a plasma. The Ni film formed over the substrate was etched with the plasma for 15 minutes. After the etching with the plasma, the substrate was unloaded from the plasma etching apparatus and loaded into a thermal CVD apparatus. The pressure of the reaction furnace was maintained at 760 Torr and the temperature of the furnace was raised to 950° C. Then, acetylene gas was supplied into the reaction furnace at a flow rate of 40 sccm for 10 minutes to grow carbon nanotubes from isolated Ni particles formed over the substrate. SEM shows that carbon nanotubes are vertically and uniformly grown over the substrate. According to TEM, the obtained carbon nanotubes have a diameter of about 60 nm and a length of about 50 μm.

EXPERIMENTAL EXAMPLE 8

A silicon oxide film was formed over a silicon substrate having a size of 2 cm by 3 cm, to a thickness of 1500 Å, and a Co—Ni alloy film was formed over the silicon oxide film to a thickness of 100 nm by thermal deposition. The substrate with the Co—Ni alloy film was immersed in an HF solution for 140 seconds for etching, and dried. Following this, the resultant substrate was loaded into a reaction furnace of a chemical CVD apparatus, and the pressure and temperature of the reaction furnace were raised to 760 Torr and 950° C., respectively. Then, ammonia gas was supplied into the reaction furnace at a flow rate of 80 sccm for 10 minutes to form isolated Co—Ni alloy particles. While keeping the temperature at 950° C., acetylene gas was supplied into the reaction furnace at a flow rate of 40 sccm for 10 minutes to grow carbon nanotubes from each of the Co—Ni alloy particles. SEM shows that carbon nanotubes are vertically and uniformly grown over the substrate. According to TEM, the obtained carbon nanotubes have a diameter of about 100 nm and a length of about 100 μm.

In the synthesis method of carbon nanotubes according to the present invention, high density catalytic metal particles can be formed isolated from each other, without agglomerating, and thus high purity carbon nanotubes can be vertically aligned over a substrate. Also, the isolated nano-sized catalytic metal particles are obtained by uniform etching over a metal catalyst layer, so that carbon nanotubes can be evenly distributed over the large-sized substrate regardless of positions on the substrate. In addition, the density, diameter and length of carbon nanotubes can be easily varied by adjusting the flow rate of etching gas and carbon source gas, and the processing temperature and time. The carbon nanotube synthesis method according to the present invention using a thermal CVD apparatus can be applied to batch type synthesis in which carbon nanotubes are grown simultaneously over a number of substrates. Thus, vertically aligned carbon nanotubes can be synthesized over a large-sized substrate with high purity and high yield. Furthermore, carbon nanotubes can be easily purified in-situ with the synthesis process with maximum synthesis efficiency.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. A method of synthesizing carbon nanotubes, comprising: forming a metal catalyst layer over a substrate;
   etching the metal catalyst layer to form isolated nano-sized catalytic metal particles evenly distributed over an area of said substrate on which said metal catalyst layer was formed; and growing carbon nanotubes from said isolated nano-sized catalytic metal particles by thermal chemical vapor deposition (CVD) in which a carbon source gas is supplied to a thermal CVD apparatus to form carbon nanotubes vertically aligned over the substrate.

2. The method of claim 1, wherein the metal catalyst layer is formed of cobalt, nickel, iron or an alloy of the same.

3. The method of claim 1, wherein forming the isolated nano-sized catalytic metal particles is performed by a gas etching method in which one etching gas selected from the group consisting of ammonia gas, hydrogen gas and hydride gas is thermally decomposed for use in etching.

4. The method of claim 3, wherein the etching gas is ammonia, and the gas etching method is performed at a temperature of 700 to 1000° C. while supplying the ammonia gas at a flow rate of 80 to 400 sccm for 10 to 30 minutes.

5. The method of claim 1, wherein growing the carbon nanotubes is performed at a temperature of 700 to 1000° C. while supplying the carbon source gas at a flow rate of 20 to 200 sccm for 10 to 60 minutes.

6. The method of claim 1, wherein forming the catalytic metal particles and forming the carbon nanotubes are in-situ performed in the same thermal CVD apparatus.

7. The method of claim 1, wherein forming the isolated nano-sized catalytic metal particles is performed by a plasma etching method in which one gas selected from the group consisting of ammonia gas, hydrogen gas and hydride gas is used to create a plasma for use in etching.

8. The method of claim 7, wherein the plasma etching includes the steps of forming a plasma under the processing condition of a frequency of 13.6 MHz, a gas pressure of 0.1 to 10 Torr, and a power of 50 to 200 watts, by supplying ammonia gas, hydrogen gas or hydride gas to the reaction chamber at a flow rate of 30 to 300 sccm, and the step of etching with the plasma at 350 to 600° C. for 5 to 30 minutes.

9. The method of claim 1, wherein forming the isolated nano-sized catalytic metal particles is performed by a wet etching method using a hydrogen fluoride series etchant.

10. The method according to claim 9, wherein said wet etching method includes the steps of immersing said substrate on which a metal catalyst layer is formed into a hydrogen fluoride series etchant for 1 to 5 minutes.

11. The method of claim 9, wherein following said wet etching method, a dry etching using a gas is performed.

12. The method of claim 1, wherein forming the isolated nano-sized catalytic metal particles is performed by photolithography using a photoresist pattern as an etching mask.

13. The method of claim 1, wherein, in forming the carbon nanotubes, one gas selected from the group consisting of ammonia gas, hydrogen gas and hydride gas is supplied to the thermal CVD apparatus along with the carbon source gas.

14. The method of claim 1, before forming the metal catalyst layer, further comprising forming an insulating layer to prevent reaction between the substrate and the metal catalyst layer.

15. The method of claim 1, after forming the carbon nanotubes, further comprising exhausting the carbon source gas using an inert gas from the thermal CVD apparatus.

16. The method of claim 1, after forming the carbon nanotubes, further comprising in-situ purifying the carbon nanotubes in the same thermal CVD apparatus.

17. The method of claim 16, wherein in-situ purifying the carbon nanotubes is performed with a purification gas selected from the group consisting of ammonia gas, hydrogen gas, oxygen gas and a mixture of these gases.

18. The method of claim 17, after in-situ purifying the carbon nanotubes, further comprising exhausting the purification gas using an inert gas from the thermal CVD apparatus.

* * * * *